United States Patent [19]

Miecke

[11] 3,995,542

[45] Dec. 7, 1976

[54] APPARATUS FOR PROCESSING CEREAL GRAINS

[75] Inventor: Wolfgang Miecke, Broitzen, Germany

[73] Assignee: Bühler-Miag GmbH, Braunschweig, Germany

[22] Filed: Aug. 14, 1974

[21] Appl. No.: 497,488

[30] Foreign Application Priority Data

Aug. 23, 1973 Germany .......................... 2342516

[52] U.S. Cl. .................................. 99/569; 99/571; 99/574; 99/580; 99/608

[51] Int. Cl.[2] ...................... B02B 3/08; B02B 5/02; B07B 1/06; A23N 5/06

[58] Field of Search ............................ 99/605–610, 99/614, 617, 630, 632, 611, 488; 222/492, 497; 193/5, 6, 14, 15, 30; 251/85, 321, 322, 323; 241/186 R, 188 R; 100/147, 148, 191, 192, DIG. 8

[56] References Cited

UNITED STATES PATENTS

| | | | |
|---|---|---|---|
| 13,894 | 12/1855 | Wrenn | 99/617 X |
| 356,273 | 1/1887 | Cranson | 99/611 |
| 414,750 | 11/1889 | Bohenblust | 193/6 |
| 1,057,747 | 4/1913 | Leetham | 99/611 |
| 1,303,143 | 5/1919 | Albers | 99/617 |
| 1,969,442 | 8/1934 | Anseele et al. | 99/610 |
| 2,030,632 | 2/1936 | Hartz | 99/611 X |
| 2,667,898 | 2/1954 | Eichmann | 251/85 |
| 3,214,105 | 10/1965 | Owens et al. | 241/188 R X |
| 3,226,045 | 12/1965 | Shelton, Jr. et al. | 241/188 R |
| 3,348,646 | 10/1967 | McCall | 193/5 |
| 3,603,365 | 9/1971 | Bess | 99/605 |
| 3,715,977 | 2/1973 | Mackenzie | 100/147 X |

FOREIGN PATENTS OR APPLICATIONS

| | | | |
|---|---|---|---|
| 1,948,418 | 9/1971 | Germany | 100/147 |
| 11,487 | 9/1899 | United Kingdom | 100/147 |

*Primary Examiner*—Harvey C. Hornsby
*Assistant Examiner*—Robert Pous
*Attorney, Agent, or Firm*—Michael J. Striker

[57] ABSTRACT

A horizontally oriented tubular screen has a shaft extending through it. Outwardly adjacent one end of the screen the shaft is configurated as a feed screw which receives cereal grain and feeds it into and through the screen. Within the confines of the screen the shaft is provided with one or more rows of pins projecting radially from the shaft. The pins of each row are located in a common plane, and the two planes include with one another an angle no greater than 90° in circumferential direction of the shaft. The outlet end of the screen communicates with an outlet section through which the cereal grains are discharged.

7 Claims, 3 Drawing Figures

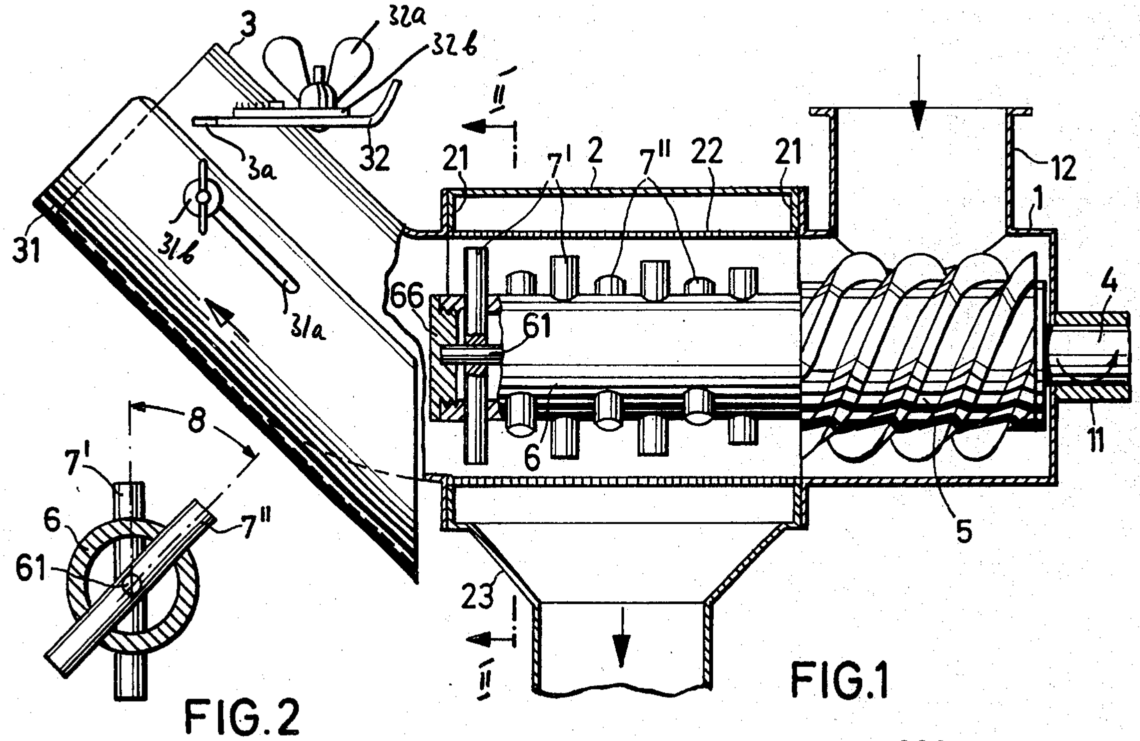
FIG.2
FIG.1
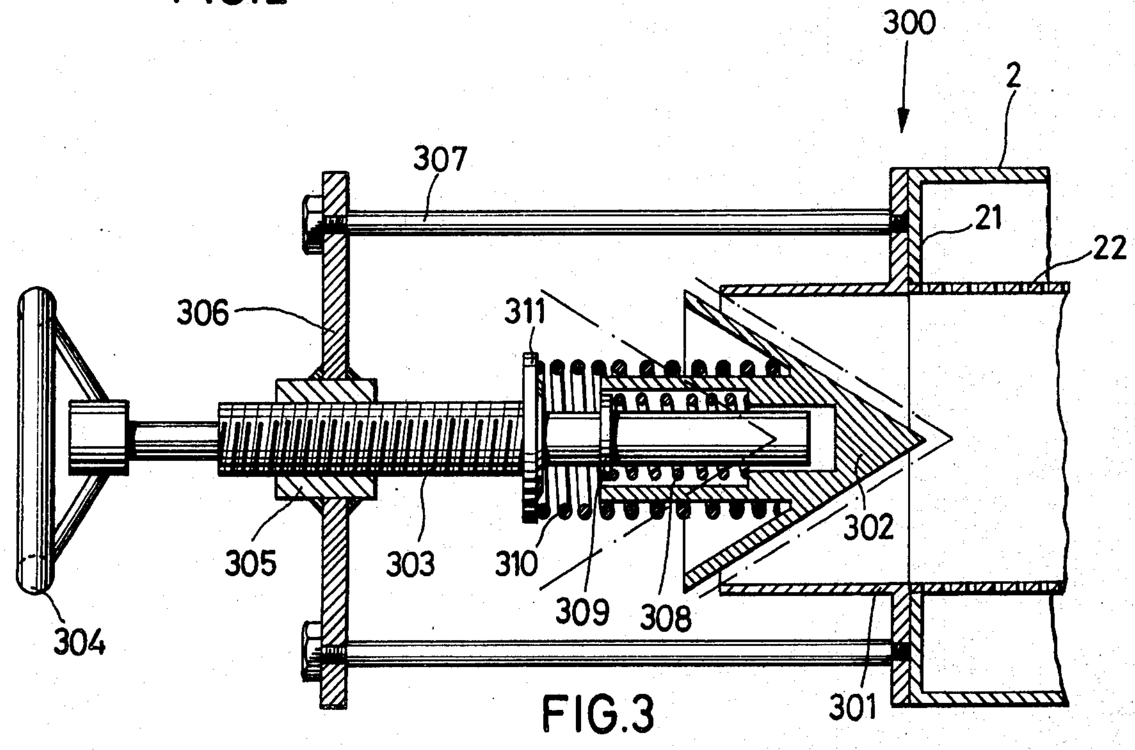
FIG.3

APPARATUS FOR PROCESSING CEREAL GRAINS

BACKGROUND OF THE INVENTION

The present invention relates generally to an apparatus for processing of cereal grains, and more particularly to an apparatus for shelling, husking or otherwise surface treating such cereal grains as corn kernels, wheat or the like.

Cereal grains include corn, wheat, rice, millet and the like. The seeds of these plants must in many instances be shelled or husked, that is have a hard shell or husk removed from the softer interior of the grain. In other instance, other surface treatments must be given to these grains. To carry out such processing, it is known from the prior art to provide an apparatus which is relatively long and into which the cereal grain is admitted in the presence of water, and is then agitated by paddles which are also so arranged that they advance the cereal grain lengthwise of the apparatus. This has certain disadvantages, including the fact that there are many instances in which it is not desirable that the cereal grain in question be wetted since this influences the grain in a manner that is not readily controllable. Furthermore, the contact with the paddles has the disadvantage that the grain undergoes substantial mechanical treatment, which is also disadvantageous. Furthermore, the trough of the apparatus in which the grain is processed, can be filled only partially and this has the disadvantage that the various grains are subjected to nonuniform processing, and that the treatment time is quite long.

Another apparatus utilizes cup-shaped members of polygonal circumference which are mounted axially adjcent on a shaft, and which are partially surrounded by a screen. This apparatus processes the cereal grains in dry condition and does not require the admixing of water with the grains. However, here again the grains are subjected largely to mechanical processing which is undesirable, and in addition the apparatus is rather manoisy, both of which are undesirable features.

SUMMARY OF THE INVENTION

Accordingly, it is a general object of the invention to provide an improved apparatus of the type in question which avoids the disadvantages of the prior art. More particularly, it is an object of the present invention to provide a novel apparatus for processing of cereal grains which is not possessed of the aforementioned disadvantages.

In this connection, it is pointed out that the term "cereal grain" as employed herein refers to individual seeds of cereal-type plants, i.e., to wheat grains, to corn kernels, to rice grains, to millet grains, and the like.

Another object of the invention is to provide such an apparatus which is to be simple in its construction and reliable in its operation.

An additional object of the invention is to provide such an apparatus which permits dry processing of the cereal grains but yet operates without the development of substantial noise.

In keeping with these objects, and with others which will become apparent hereafter, one feature of the invention resides in an apparatus for processing cereal grains, particularly for shelling corn, which briefly stated comprises a horizontally oriented tubular screen having spaced ends, a housing surrounding the screen and having a grain inlet axially spaced from one of the ends, and a shaft extending through the housing. The shaft has a first portion configurated as a feed screw and positioned adjacent the one end of the screen to receive grain from the inlet and convey the grain into and axially through the screen. The shaft further has a second portion which is located within the confines of the screen and is provided with at least one group of pins projecting radially from the second portion for agitating the grain in the screen. An outlet section communicates with the other end of the screen for receiving processed grain from the latter.

It is advantageous if two or more groups of the aforementioned pins are provided, with the pins of each group being located in a common radial plane relative to the second portion of the shaft, and with the planes including with one another an angle smaller than 90° in circumferential direction of the second portion of the shaft. However, it is also possible to use three groups of such pins.

An apparatus according to the present invention assures that the necessary friction which is required for removing the husks or shells of the individual grains, is largely the result of rubbing of the rains against one another, rather than the result of the mechanical action of components of the apparatus upon the grains. The pins merely serve to somewhat agitate the grains in the screen, which latter is filled with grain, but do not actually serve to remove the husks or shells from the grains. With such a construction, the apparatus can be very simple and will be highly effective, obtaining a very uniform husking or shelling effect for the individual grains. Moreover, the apparatus can be quite small in its construction, so that for instance the diameter of the tubular screen need not be larger than approximately 100mm in order to obtain an efficient operation. As a result of all this, the energy requirement for operating the apparatus is also substantially smaller than what is known from the prior art, and the noise resulting from operation of the novel apparatus is substantially decreased over the similar development in prior-art machines.

It has been found that it is particularly advantageous if the length to which the pins project from the outer circumferential surface of the second portion of the shaft, increases in the direction from the inlet end towards the outlet end of the tubular screen. The second portion of the shaft can be of uniform diameter over its length, in which case the length of the pins would have to increase in direction from the inlet end towards the outlet end of the tubular screen. However, the second portion of the shaft could also be conical, in which case the length of the individual pins could be uniform except that they would project to different extents past the circumference of the shaft. A combination of the two possibilities can also be utilized.

It has been found particularly advantageous if the angle included between the planes of the two rows of pins, if indeed two rows are provided, is on the order of approximately 40°, with a deviation of ±5°. While the use of two groups of pins has been found to be the most advantageous, it is again emphasized that a single group of pins, or more than two groups, such as three groups, could also be utilized. This would depend upon the particular type of grain to be processed and the particular type of processing to which the grain is to be subjected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic axial vertical section through an apparatus according to the present invention.

FIG. 2 is a fragmentary section on line II—II of FIG. 1, with parts omitted for the sake of clarity; and FIG. 3 is a fragmentary partly sectioned detail view illustrating a further embodiment of the invention.

DESCRIPTION OF THE PREFERRED EMBODIMENTS

Referring to the embodiment that is illustrated in FIGS. 1 and 2, it will be seen that the apparatus according to the present invention has three axially adjacent sections 1, 2 and 3. The section 1 identifies the inlet section, the section 2 identifies the working section and the section 3 idenfies the outlet section of the apparatus. Located in the housing of the working section 2 is a substantially horizontally oriented tubular screen 22. A shaft composed of the portions 5 and 6 extends coaxially through the screen 22 and has an end portion 4 which is journalled for rotation in a tubular extension 11 of the right-hand end wall of the housing of the inlet section 1. The shaft is therefore mounted in cantilever fashion, it being evident that its left-hand end in FIG. 1 is not supported.

The section 5 of the shaft is configurated as a conventional feed screw, the screw flights of which advance cereal grain that is admitted through the inlet 12, in the direction towards the left in FIG. 1, that is into and through the screen 22. A drive for the shaft 5, 6 has not been illustrated because any suitable drive can evidently be employed and such drives are well known per se.

The housing of the working section 2 is provided with radially inwardly extending flanges 21 intermediate which the screen 22 is located. It is secured by means of these flanges to the housing of the inlet section 1, in suitable manner which need not be further described since it is conventional. It is further secured by means of one of these flanges 21 to a tubular outlet section 3 which communicates with the downstream of the screen 22, that is the left-hand end in FIG. 1. The downwardly directed side of the housing of the working section 2 communicates with or is provided with a discharge hopper 23 through which material that has passed through the apertures of the screen 22—i.e., husks, shells or the like—is discharged.

The outlet section 3 is of tubular configuration in FIGS. 1 and 2 and is bent upwardly as illustrated. At least in the region where it communicates with the screen 22, the outlet 3 has a diameter corresponding to the inner diameter of the screen 22. The purpose of having the outlet section 3 bent upwardly to its upper outlet end is to assure a certain retardation of the advancement of the material in the interior of the screen 22 without requiring any additional means for this purpose. This assures that the screen 22 will always be filled with material as long as new material is admitted into the inlet 12. The downwardly directed side of the tubular outlet section 3 is closely surrounded by a trough-shaped baffle or extension 31 which in the illustrated embodiment is of semicircular outline and provided with two transversely spaced elongated slots 31*a* (one shown) through which screws fastened to the outlet section 3 extend onto the free ends of which screws wing nuts 31*b* (one shown) are threaded. Thus, by loosening the wing nuts 31*b* the baffle 31 can be moved upwardly in the direction of the associated arrow, or downwardly opposite to that direction, to thereby raise or lower the actual level of the outlet section 3. The cross-sectional area of the output end of the outlet section 3 can also be made variable, for which purpose the outlet section 3 may be provided with the illustrated slot 3*a* in which a member 32 is slidably received, so that it can slide towards the left or towards the right in FIG. 1. A member 32*b* is fixedly mounted on the outlet section 3, and a screw mounted on the member 32 can extend through a slot (not shown) in the member 32*b*, and have a wing nut 32*a* threaded onto its free end. When the wing nut 32*a* is loosened, the member 32 can be shifted towards the left or towards the right and, since it extends through the slot 3*a* into the interior of the outlet section 3, it will increase or decrease the cross-sectional area in the interior or the outlet section 3, depending upon the direction in which it is shifted. This can, of course, also be used to retard to a greater or lesser degree the outflow of grain and thus to assure that the interior of the screen 22 will always be filled with material.

In the illustrated embodiment, the portion 6 of the shaft is cylindrical and hollow, having a plurality of radial pins 7′, 7″ extending through it. The pins 7′ are arranged in form of one group so that their free ends are located in a first radial plane of the portion 6, and the pins 7″ are arranged in a second group whose free ends are located in a second radial plane, and the two planes define with one another an angle 8 (see FIG. 2) of 40°, ±5°. The length of the projection portions of the pins 7′, 7″ increases in direction from the right-hand end to the left-hand end of the screen 22. This arrangement, in which each pin 7′ alternates axially in the shaft portion 6 with a pin 7″, assures that the material being processed, that is the cereal grain, can travel between the pins and will be only agitated by them, but will not be conveyed by them. In actual fact, the conveying from the right-hand end of the screen 22 is the result only of the feeding action of the screw 5. The pins 7′, 7″ serve only to provide an agitation of the grains, so that in conjunction with the rubbing of the grains against one another that is caused by the agitation of the pins 7′, 7″, and in conjunction with the rubbing of the grains against the inner surface of the screen 22, the desired processing of the grains—e.g., husking or shelling—takes place.

In the illustrated embodiment, the pins 7′, 7″ passes through radial bores formed in shaft portion 6, and a common centrally located pin 61 passes through the centers of the pins 7′, 7″ and holds the latter in place. The pin 61 extends at one end into an end cap or end member 66 which closes the shaft portion 6, and its other end is suitably secured (not shown), for example by extending into an appropriate retainer on the shaft portion 5 which may be solid in cross section. The fact that the length of the pins 7′, 7″ increases in direction towards the left-hand end (i.e., the outlet end) of the screen 22, has been found to be important for the purpose of obtaining a uniform and satisfactory shelling or husking effect.

The diameter of the screen 22 need not be greater than approximately 100mm to obtain satisfactory results. The length of the screen 22 need not be more than double the diameter, and the rotation of the shaft 5, 6 is advantageously so selected that the shaft will rotate in the range of 800 rpm$^{-1}$ (±15%).

While it is advantageous that the shaft portion 6 extend to the junction between the sections 2 and 3, it is also possible to have it terminate short of the junction or to have it extend slightly beyond the junction. It is also possible to replace the pins 7′, 7″ with bolts which can be mounted on the shaft portion 6 by means of nuts. In any case, however, the material of the pins or bolts should be highly resistant to water. The shaft portion 6 could also be conical, that is have a diameter which decreases in the direction towards the outlet section 3. In that case, the length of the pins 7′, 7″ could be uniform, since the extent to which they would project beyond the circumference of such a conical shaft portion 6 would automatically be greater in the direction towards the left-hand end due to the taper of the shaft portion.

The shaft portions 5 and 6 can be made of one piece with one another, and access can be had to the interior of the apparatus by simply removing the housing of the inlet section 1 and axially withdrawing the shaft 5, 6. However, it is also possible to connect the shaft portions 5 and 6 by means of screw threads, which are so selected that they cannot become unthreaded during rotation of the shaft. In this case, the shaft portion 5 could be unthreaded from the shaft portion 6 for removal from the screen 22. In any case, however, inspection and repair can be carried out in a very simple manner by removing the housing of the inlet section 1, and the pins can be inspected and replaced in a simple manner also as a result of this construction.

The embodiment of FIG. 3 is largely the same as that of FIGS. 1 and 2, and therefore FIG. 3 shows only those portions which differ from FIGS. 1 and 2. The embodiment of FIG. 3 has been tested and found to be particularly advantageous. In this embodiment, the sections 1 and 2 and their associated components are the same as described with reference to FIGS. 1 and 2. What is different is the outlet section 300 which replaces the outlet section 3 in the preceding embodiment. The outlet section 300 is here in form of a tubular member 301 which is arranged coaxially with reference to the shaft portion 6 (not shown in this Figure) and the screen 22 which can be connected to the working section 2 by means of flanges similar to the flanges 21. Extending into the left-hand open end of the tubular member 301 is a conical member 302 the tip of which extends into the member 301 and which is mounted for axial displacement on a threaded spindle 303. The latter can be turned by means of a handwheel 304 and is threaded into a tucked sleeve 305 that is mounted in a cover or traverse 306. The cover or traverse 306 is connected by means of rods 307 with the flanges of the tubular member 301. Turning of the handwheel 304 thus displaces the threaded spindle 303 towards the right or towards the left, depending upon the direction in which the handwheel 304 is turned.

The conical member 302 is provided with an axial bore into which the right-hand end of the threaded spindle 305 extends. An inner relatively strong helical expansion spring 308 surrounds the right-hand end of the spindle 303 and bears upon the conical member 302 and upon an abutment 309 provided on the spindle for this purpose. A coaxial outer substantially less strong helical expansion spring 310 also bears upon the conical member 302 and upon an abutment 311 provided on the spindle 303 for this purpose. The inner spring 308 serves to press the member 302 against the grain in the interior of the screen 22 and of the tubular member 301, and the degree of pressure and therefore the pressure prevailing within the screen 22 and the member 301 can be accurately adjusted by turning the spindle 303 via the handwheel 304. This permits an excellent adjustment of the degree of shelling or husking that is desired. However, the extent to which the member 302 can move axially of the spindle 303 is limited, as indicated by the broken-line terminal positions which have been shown in FIG. 3. The purpose of the spring 310 is to assure that if no further material is being fed into the screen 22 by the screw 5, or if not enough material is yet present during starting up of the apparatus to fill the screen 22, the conical member 302 will be pressed against the left-hand open end of the tubular member 301 and close it until the interior of the screen 22 and of the tubular member 301 is filled with material. However, the spring 310 is so dimensioned that it will permit the conical member 302 to yield towards the left in FIG. 3 as soon as the interior of the screen 22 and of the tubular member 301 is filled and additional material entering via the screw 5 exerts pressure upon the member 302.

It will be understood that each of the elements described above, or two or more together, may also find a useful application in other types of constructions differing from the type described above.

While the invention has been illustrated and described as embodied in an apparatus for processing cereal grains, it is not intended to be limited to the details shown, since various modifications and structural chamges may be made without departing in any way from the spirit of the present invention.

Without further analysis, the foregoing will so fully reveal the gist of the present invention that others can be applying current knowledge readily adapt it for various applications with omitting features that, from the standpoint of prior art, fairly constitute essential characteristics of the generic or specific aspects of this invention.

What is claimed as new and desired to be protected by Letters Patent is set forth in the appended claims:

1. Apparatus for shelling cereal grains comprising a horizontally oriented tubular screen having spaced ends and a predetermined diameter; a housing surrounding said screen and having a grain inlet axially spaced from one of said ends; a shaft extending through said housing and having a first portion configurated as a screw and positioned adjacent said one end to receive grain from said inlet and to convey the grain into and axially through said screen, and a second portion located within the confines of said screen; at lest one group of pins projecting radially from said second portion for agitating the grain in said screen; outlet means communicating at one end thereof with said other of said ends of said screen for receiving shelled grain from the latter, said one end of said outlet means being coaxial with said screen and of the same diameter of said predetermined diameter to avoid any dead spaces between said other end of said screen and said one end of said outlet means, said outlet being tubular and inclined upwardly from said other end of said screen to an outlet opening at said outlet means to assure that the grain being shelled remains during operation of the apparatus a predetermined time within said screen; a trough-shaped baffle surrounding a downwardly facing side of said tubular outlet means; and mounting means mounting said baffle on said outlet means for displacement axially beyond said output opening to a selectable extent.

2. An apparatus as defined in claim 1, including bearing means for said first shaft portion and said housing axially spaced from said one end of said screen, said shaft projecting in cantilever fashion through said screen.

3. An apparatus as defined in claim 1; and further comprising at least one additional group of pins also projecting radially from said second portion of said shaft, the pins of each group being spaced from one another axially of said second portion and located in a common plane, and the planes of said groups of pins including with one another an angle smaller than 90° in circumferential direction of said second portion.

4. An apparatus as defined in claim 2, wherein the pins of the first-mentioned group alternate in direction axially of said second portion with the pins of said additional group.

5. An apparatus as defined in claim 2, wherein the axially successive pins of each group project radially outwardly past said second portion to increasing extents in direction from said one to said other end of said screen.

6. An apparatus as defined in claim 3, wherein in said second portion of said shaft has a uniform diameter throughout its length, and wherein axially successive pins of each group project radially outwardly past said second portion to increasing extends in direction from said one to said other end of said screen.

7. Apparatus for shelling cereal grains comprising a horizontally oriented tubular screen having spaced ends and a predetermined diameter; a housing surrounding said screen and having a grain inlet axially spaced from one of said ends; a shaft extending through said housing and having a first portion configurated as a feed screw and positioned adjacent to one end to receive grain from said inlet and convey the grain into and axially through the screen and a second portion located within the confines of said screen; at least one group of pins projecting radially from said second portion for agitating the grain in the screen; and outlet means comprising a tubular member communicating at one end thereof with said other of said ends of said screen for receiving shelled grain from the latter, said one end of said tubular member being coaxial and of the same diameter as said predetermined diameter of said screen to avoid any dead spaces between said other end of said screen and said one end of said tubular member, said tubular member having an output opening axially spaced from said other end, and said output means further comprising a conical member mounted in the region of said output opening and having a tip extending into the latter, a threaded spindle coaxial with said tubular member and mounted for displacement axially of the same, said conical member being mounted on said spindle for axial displacement relative thereto, and biasing means resiliently urging said conical member in a direction inwardly of said output opening, said biasing means comprising an inner helical expansion spring surrounding said spindle and bearing upon the latter and said conical member, and a conical outer helical expansion spring which also surrounds said spindle and bears upon the same and upon said conical member, said outer spring being weaker than said inner spring.

* * * * *